United States Patent
Yang et al.

(10) Patent No.: US 9,474,003 B2
(45) Date of Patent: Oct. 18, 2016

(54) TRANSMISSION METHOD AND RECEPTION METHOD FOR UPLINK SIGNAL, USER EQUIPMENT, AND BASE STATION

(75) Inventors: Suckchel Yang, Anyang-si (KR); Mingyu Kim, Anyang-si (KR); Joonkui Ahn, Anyang-si (KR); Dongyoun Seo, Anyang-si (KR)

(73) Assignee: LG ELECTRONICS INC., Seoul (KR)

(*) Notice: Subject to any disclaimer, the term of this patent is extended or adjusted under 35 U.S.C. 154(b) by 497 days.

(21) Appl. No.: 14/005,495

(22) PCT Filed: Mar. 21, 2012

(86) PCT No.: PCT/KR2012/002005
§ 371 (c)(1),
(2), (4) Date: Sep. 16, 2013

(87) PCT Pub. No.: WO2012/128544
PCT Pub. Date: Sep. 27, 2012

(65) Prior Publication Data
US 2014/0003392 A1    Jan. 2, 2014

Related U.S. Application Data

(60) Provisional application No. 61/454,577, filed on Mar. 21, 2011.

(51) Int. Cl.
*H04W 36/28* (2009.01)
*H04L 5/00* (2006.01)
*H04L 5/14* (2006.01)

(52) U.S. Cl.
CPC .............. *H04W 36/28* (2013.01); *H04L 5/001* (2013.01); *H04L 5/0053* (2013.01); *H04L 5/0094* (2013.01); *H04L 5/1469* (2013.01)

(58) Field of Classification Search
CPC .................... H04W 72/0413; H04W 72/0406; H04W 72/0453; H04W 72/0446; H04L 5/001
USPC .......................... 370/252, 329, 330
See application file for complete search history.

(56) References Cited

U.S. PATENT DOCUMENTS

2010/0098012 A1    4/2010  Bala et al.
2011/0134774 A1*   6/2011  Pelletier .............. H04W 52/365
                                                          370/329

(Continued)

FOREIGN PATENT DOCUMENTS

KR    1020110011281    2/2011
WO     2010105254      9/2010
WO     2011021830      2/2011

OTHER PUBLICATIONS

PCT International Application No. PCT/KR2012/002005, Written Opinion of the International Searching Authority dated Oct. 23, 2012, 17 pages.

*Primary Examiner* — Charles C Jiang
*Assistant Examiner* — Will Lin
(74) *Attorney, Agent, or Firm* — Lee, Hong, Degerman, Kang & Walmey; Jonathan Kang; Michael Monaco

(57) ABSTRACT

The method and device proposed by the present invention, in a carrier situation having a UE consisting of a plurality serving cells, change a serving cell used in transmitting uplink control information from a specific serving cell to a different serving cell under the control of a BS or the control of a UE. The present invention enables a faster and more flexible transmission/reception of the UL control information.

16 Claims, 9 Drawing Sheets

(56) References Cited

U.S. PATENT DOCUMENTS

2012/0140649 A1* 6/2012 Choudhury ........... H04W 24/10
370/252

2013/0155915 A1* 6/2013 Park ........................ H04L 5/14
370/280
2014/0269539 A1* 9/2014 Yin ....................... H04L 5/0092
370/329

* cited by examiner

TRANSMISSION METHOD AND RECEPTION METHOD FOR UPLINK SIGNAL, USER EQUIPMENT, AND BASE STATION

CROSS-REFERENCE TO RELATED APPLICATIONS

This application is the National Stage filing under 35 U.S.C. 371 of International Application No. PCT/KR2012/002005, filed on Mar. 21, 2012, which claims the benefit of U.S. Provisional Application Ser. No. 61/454,577, filed on Mar. 21, 2011, the contents of which are all hereby incorporated by reference herein in their entirety.

TECHNICAL FIELD

The present invention relates to a wireless communication system. Particularly, the present invention provides a more effective uplink/downlink signal transmission/reception method and transmission/reception apparatus in a carrier aggregation environment in which a plurality of serving cells are configured.

BACKGROUND ART

A general wireless communication system transmits/receives data through one downlink (DL) band and through one uplink (UL) band corresponding to the DL band (in case of Frequency Division Duplex (FDD) mode), or divides a prescribed radio frame into UL time unit(s) and DL time unit(s) in a time domain and transmits/receives data through the UL/DL time unit(s) (in case of Time Division Duplex (TDD) mode). A Base Station (BS) and a User Equipment (UE) transmit and receive data and/or control information scheduled on a prescribed time unit basis, i.e. on a subframe basis. The data is transmitted and received through a data region configured in a UL/DL subframe and the control information is transmitted and received through a control region configured in the UL/DL subframe. To this end, various physical channels carrying radio signals are formed in the UL/DL subframe.

Meanwhile, to use a wider frequency band in a recent wireless communication system, introduction of carrier aggregation (or bandwidth aggregation) technology that uses a wider UL/DL bandwidth by aggregating a plurality of UL/DL frequency blocks has been discussed.

FIG. 1 illustrates an example of performing communication in a multicarrier situation.

A multicarrier system or Carrier Aggregation (CA) system refers to a system using a wide bandwidth by aggregating a plurality of carriers each having a narrower bandwidth than the target bandwidth. The CA system is different from an Orthogonal Frequency Division Multiplexing (OFDM) system in that DL or UL communication is performed using a plurality of carrier frequencies, whereas the OFDM system up-converts a base frequency band, which is divided into a plurality of orthogonal subcarriers, into a single carrier frequency to perform DL or UL communication. When a plurality of carriers each having a narrower bandwidth than a target bandwidth is aggregated, the bandwidth of each of the aggregated carriers may be limited to a bandwidth used in a legacy system in order to ensure backward compatibility with the legacy system. For example, the legacy system supports bandwidths of 1.4, 3, 5, 10, 15, and 20 MHz and the LTE-Advanced (LTE-A) system evolved from the LTE system may support a bandwidth wider than 20 MHz using only bandwidths supported in the LTE system. Alternatively, CA may be supported by defining a new bandwidth irrespective of the bandwidths used in the legacy system. The term multicarrier is used interchangeably with the term Carrier Aggregation (CA) or bandwidth aggregation. Contiguous CA and non-contiguous CA are collectively referred to as CA. For reference, when only one Component Carrier (CC) is used for communication in TDD or when only one UL CC and one DL CC are used for communication in FDD, this corresponds to communication under a single carrier situation (non-CA).

DISCLOSURE

Technical Problem

In multicarrier aggregation in which a plurality of aggregated carriers is used for communication between a BS and a UE, a communication method using a single carrier cannot be applied to communication using multiple carriers. A new communication method suitable for communication using a plurality of carriers while minimizing an effect on a legacy system should be defined.

It will be appreciated by persons skilled in the art that that the technical objects that can be achieved through the present invention are not limited to what has been particularly described hereinabove and other technical objects of the present invention will be more clearly understood from the following detailed description.

Technical Solution

In an aspect of the present invention, provided herein is a method for transmitting an uplink signal to a base station by a user equipment in which a plurality of serving cells including a primary cell (PCell) and including one or more secondary cells (SCells) are configured, comprising: receiving information indicating a specific SCell among the one or more SCells from the base station; configuring the specific SCell as a serving cell for uplink control channel transmission; and transmitting an uplink control channel of the user equipment to the base station using the specific SCell configured as the serving cell for uplink control channel transmission.

In another aspect of the present invention, provided herein is a method for receiving, by a base station, an uplink signal from a user equipment in which a plurality of serving cells including a primary cell (PCell) and including one or more secondary cells (SCells) are configured, comprising: configuring a specific SCell among the one or more SCells as a serving cell for uplink control channel transmission; transmitting information indicating the specific SCell to the user equipment; and receiving an uplink control channel of the user equipment from the user equipment using the specific SCell configured as the serving cell for uplink control channel transmission.

In still another aspect of the present invention, provided herein is a user equipment, in which a plurality of serving cells including a primary cell (PCell) and including one or more secondary cells (SCells) are configured, for transmitting an uplink signal to a base station, comprising: a radio frequency (RF) unit configured to transmit/receive a radio signal; and a processor configured to control the RF unit, wherein the processor controls the RF unit to receive information indicating a specific SCell among the one or more SCells from the base station, configures the specific SCell as a serving cell for uplink control channel transmission, and controls the RF unit to transmit an uplink control channel of the user equipment to the base station using the specific SCell configured as the serving cell for uplink control channel transmission.

In a further aspect of the present invention, provided herein is a base station for receiving an uplink signal from a user equipment in which a plurality of serving cells including a primary cell (PCell) and including one or more secondary cells (SCells) are configured, including a radio frequency (RF) unit configured to transmit/receive a radio signal; and a processor configured to control the RF unit, wherein the processor configures a specific SCell among the one or more SCells as a serving cell for uplink control channel transmission, controls the RF unit to transmit information indicating the specific SCell to the user equipment, and controls the RF unit to receive an uplink control channel of the user equipment from the user equipment using the specific SCell configured as the serving cell for uplink control channel transmission.

In each aspect of the present invention, the PCell among the plurality of serving cells may be configured during initial connection establishment of the user equipment and the one or more SCells among the plurality of serving cells may be added after the initial connection establishment, and the uplink control channel of the user equipment may be transmitted or received using only the serving cell for uplink control channel transmission.

In each aspect of the present invention, configuring the specific SCell may include changing the PCell, which is initially configured as the serving cell for uplink control channel transmission, to the specific SCell.

In each aspect of the present invention, the base station may transmit new information indicating a serving cell other than the specific SCell and the user equipment may change the serving cell for uplink control channel transmission from the specific SCell to the serving cell other than the specific SCell.

The above technical solutions are merely some parts of the embodiments of the present invention and various embodiments into which the technical features of the present invention are incorporated can be derived and understood by persons skilled in the art from the following detailed description of the present invention.

Advantageous Effects

According to the present invention, which is applied to carrier aggregation in which a plurality of carriers are used for communication between a base station and a user equipment, more efficient uplink/downlink transmission/reception can be performed.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention. In the drawings.

MODE FOR INVENTION

Figure 1:
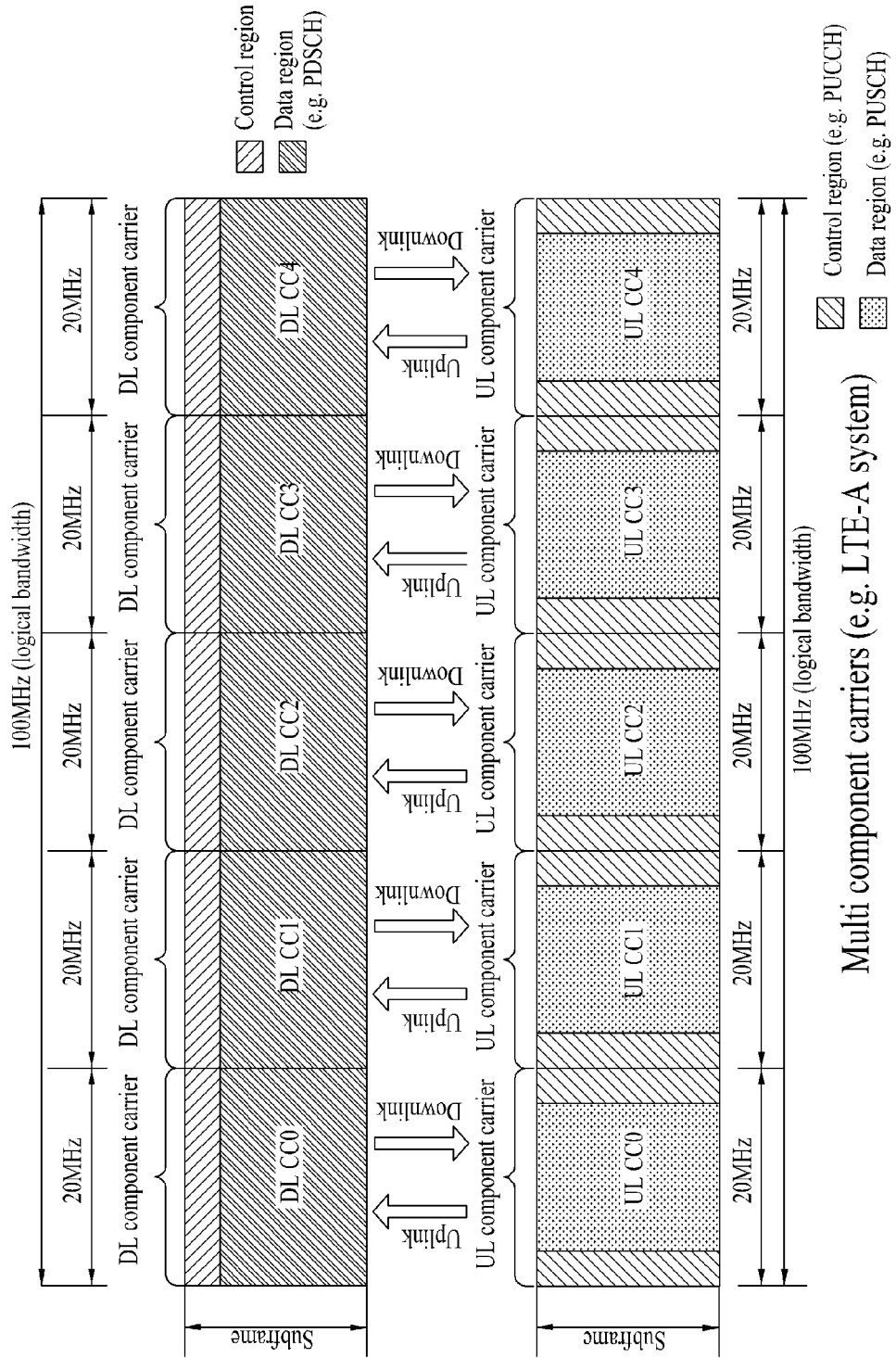
FIG. 1 illustrates an example of performing communication in a multicarrier situation.

Hereinafter, the exemplary embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment through which the present invention can be carried out. The following detailed description includes detailed matters to provide full understanding of the present invention. However, it will be apparent to those skilled in the art that the present invention can be carried out without the detailed matters.

In some cases, to prevent the concept of the present invention from becoming ambiguous, structures and apparatuses of the known art will be omitted, or will be shown in the form of a block diagram based on main functions of each structure and apparatus. In addition, wherever possible, the same reference numbers will be used throughout the drawings and the specification to refer to the same or like parts.

In the present invention, a User Equipment (UE) may be a fixed or mobile device. Examples of the UE include various devices that transmit and receive user data and/or various kinds of control information to and from a base station. The UE may be referred to as a Terminal Equipment (TE), a Mobile Station (MS), a Mobile Terminal (MT), a User Terminal (UT), a Subscriber Station (SS), a wireless device, a Personal Digital Assistant (PDA), a wireless modem, or a handheld device. In addition, in the present invention, a Base Station (BS) means a fixed station that performs communication with a UE and/or another BS, and exchanges various kinds of data and control information with the UE and another BS. The BS may be referred to as an Advanced Base Station (ABS), a Node-B (NB), an Evolved-NodeB (eNB), a Base Transceiver System (BTS), an Access Point (AP), or a Processing Server (PS).

In the present invention, a Physical Downlink Control Channel (PDCCH), a Physical Control Format Indicator Channel (PCFICH), a Physical Hybrid automatic retransmit request Indicator Channel (PHICH), and a Physical Downlink Shared CHannel (PDSCH) may indicate a set of time-frequency resources or Resource Elements (REs) carrying Downlink Control Information (DCI), a set of time-frequency resources or REs carrying Control Format Indicator (CFI), a set of time-frequency resources or REs carrying downlink ACK/NACK, and a set of time-frequency resources or REs carrying DL data, respectively. In addition, a Physical Uplink Control CHannel (PUCCH), a Physical Uplink Shared CHannel (PUSCH), and a Physical Random Access CHannel) (PRACH) may indicate a set of time-frequency resources or REs carrying Uplink Control Information (UCI), a set of time-frequency resources or REs carrying UL data, and a set of time-frequency resources REs carrying a random access signal, respectively. In the present invention, a time-frequency resource or RE that is assigned to or belongs to PDCCH/PCFICH/PHICH/PDSCH/PUCCH/PUSCH/PRACH may be called PDCCH/PCFICH/PHICH/PDSCH/PUCCH/PUSCH/PRACH RE or PDCCH/PCFICH/PHICH/PDSCH/PUCCH/PUSCH/PRACH resource. Therefore, in the present invention, PUCCH/PUSCH/PRACH transmission of a UE may be conceptually identical to UL control information/UL data/random access signal transmission on PUSCH/PUCCH/PRACH, respectively. In addition, PDCCH/PCFICH/PHICH/PDSCH transmission of a BS may be conceptually identical to DL data/control information transmission on PDCCH/PCFICH/PHICH/PDSCH, respectively.

Figure 2:
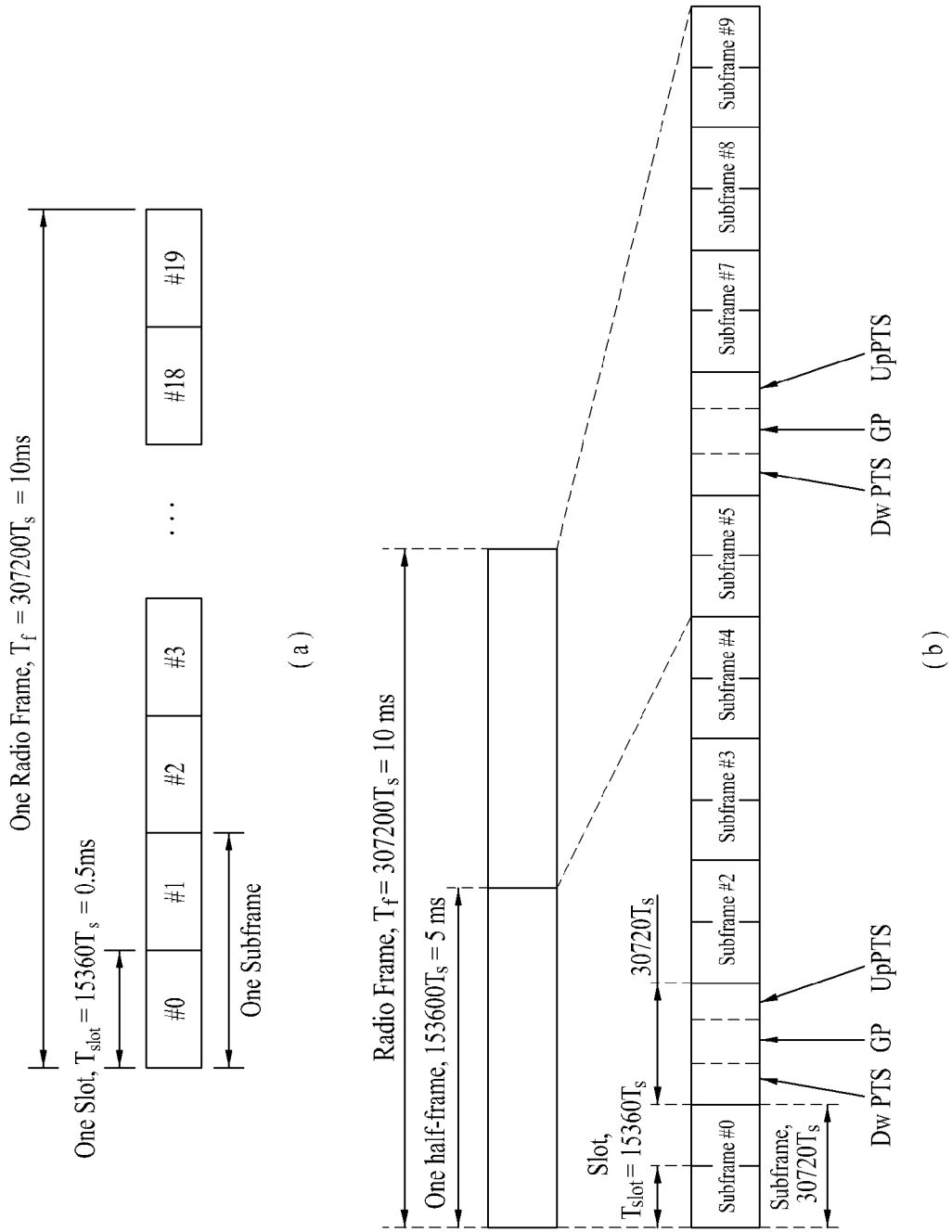
FIG. 2 illustrates an exemplary structure of a radio frame used in a wireless communication system.

FIG. 2 illustrates an exemplary structure of a radio frame used in a wireless communication system. Specifically, FIG. 2(a) illustrates an exemplary structure of a radio frame which can be used in FDD in 3GPP LTE(-A) and FIG. 2(b) illustrates an exemplary structure of a radio frame which can be used in TDD in 3GPP LTE(-A).

Referring to FIG. 2, a 3GPP LTE(-A) radio frame is 10 ms (307,200$T_s$) in duration. The radio frame is divided into 10 subframes of equal size. Subframe numbers may be assigned to the 10 subframes within the radio frame, respectively. $T_s$ denotes sampling time, where $T_s=1/(2048*15 \text{ kHz})$. Each subframe is 1 ms long and further divided into two slots. 20 slots are sequentially numbered from 0 to 19 in a radio frame. Duration of each slot is 0.5 ms. A time interval in which one subframe is transmitted is defined as a Transmission Time Interval (TTI). Time resources may be distinguished by a radio frame number (or radio frame index), a subframe number (or subframe index), a slot number (or slot index), and the like.

A radio frame may have different configurations according to duplex mode. In FDD mode for example, since DL transmission and UL transmission are discriminated according to frequency, a radio frame for a specific frequency band includes either DL subframes or UL subframes. In TDD mode, since DL transmission and UL transmission are discriminated according to time, a radio frame for a specific frequency band includes both DL subframes and UL subframes.

Particularly, FIG. 2 illustrates a TDD frame structure used in 3GPP LTE(-A). Table 1 shows exemplary DL-UL configurations for subframes in a radio frame in TDD mode.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D is a DL subframe, U is a UL subframe, and S is a special subframe. The special subframe includes three fields, i.e., Downlink Pilot Time Slot (DwPTS), Guard Period (GP), and Uplink Pilot Time Slot (UpPTS). DwPTS is a time period reserved for DL transmission and UpPTS is a time period reserved for UL transmission. Table 2 shows an exemplary special frame configuration.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | | |
| 5 | 6592 · $T_s$ | 4384 · $T_s$ | 5120 · $T_s$ | 20480 · $T_s$ | 4384 · $T_s$ | 5120 · $T_s$ |
| 6 | 19760 · $T_s$ | | | 23040 · $T_s$ | | |
| 7 | 21952 · $T_s$ | | | — | — | — |
| 8 | 24144 · $T_s$ | | | — | — | — |

Figure 3:
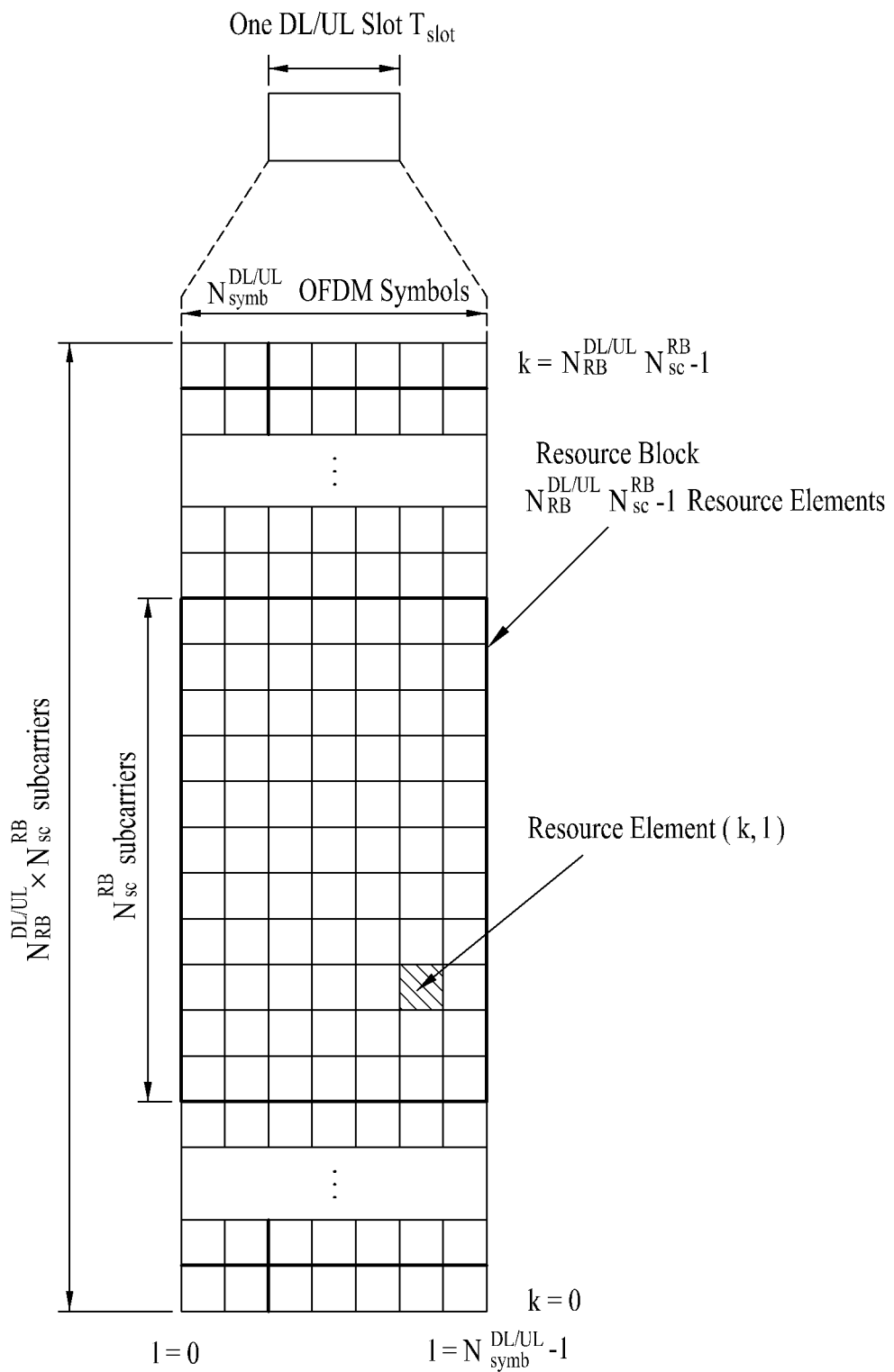
FIG. 3 illustrates an exemplary structure of a DL/UL slot in a wireless communication system.

FIG. 3 illustrates an exemplary structure of a DL/UL slot in a wireless communication system. Specifically, FIG. 3 illustrates the structure of a resource grid in a 3GPP LTE(-A) system.

Referring to FIG. 3, a slot includes a plurality of OFDM symbols in the time domain and a plurality of Resource Blocks (RBs) in the frequency domain. An OFDM symbol may refer to one symbol duration. An RB includes a plurality of subcarriers in the frequency domain. An OFDM symbol may also be called an SC-FDM symbol etc. according to a multiple access scheme. The number of OFDM symbols per slot may vary depending on channel bandwidth and CP length. For instance, one slot includes 7 OFDM symbols in case of a normal CP, whereas one slot includes 6 OFDM symbols in case of an extended CP. While a subframe is shown in FIG. 2 as having a slot with 7 OFDM symbols for convenience of description, embodiments of the present invention are also applicable to subframes with any other number of OFDM symbols. A resource including one OFDM symbol and one subcarrier is referred to as a Resource Element (RE) or a tone.

Referring to FIG. 3, a signal transmitted in each slot may be expressed by a resource grid including $N^{DL/UL}_{RB} \cdot N^{RB}_{sc}$ subcarriers and $N^{DL/UL}_{symb}$ OFDM or SC-FDM symbols. $N^{DL}_{RB}$ represents the number of RBs in a DL slot and $N^{UL}_{RB}$ represents the number of RBs in a UL slot. $N^{DL}_{RB}$ and $N^{UL}_{RB}$ depend on a DL transmission bandwidth and a UL transmission bandwidth, respectively. Each OFDM symbol includes $N^{DL/UL}_{RB} \cdot N^{RB}_{sc}$ subcarriers. The number of subcarriers per carrier is determined by the size of Fast Fourier Transform (FFT). Subcarriers may be divided into data subcarriers for data transmission, reference signal subcarriers for reference signal transmission, and null subcarriers for a guard band and a Direct Current (DC) component. The null carriers for the DC component are unused remaining subcarriers and are mapped to a carrier frequency $f_0$ in a process of generating an OFDM signal. The carrier frequency is also referred to as a center frequency. $N^{DL}_{symb}$ represents the number of OFDM or SC-FDMA symbols in the DL slot and $N^{UL}_{symb}$ represents the number of OFDM or SC-FDMA symbols in the UL slot. $N^{RB}_{sc}$ represents the number of subcarriers in one RB. An RB is defined as $N^{DL/UL}_{symb}$ (e.g. 7) consecutive OFDM symbols or SC-FDMA symbols in the time domain and $N^{RB}_{sc}$ (e.g. 12) consecutive subcarriers in the frequency domain. Therefore, one PRB includes $N^{DL/UL}_{symb} \cdot N^{RB}_{sc}$ REs. Each RE in the resource grid may be uniquely identified by an index pair (k,l) in a slot. k is a frequency-domain index ranging from 0 to $N^{DL/UL}_{RB} \cdot N^{RB}_{sc} - 1$ and l is a time-domain index ranging from 0 to $N^{DL/UL}_{symb} - 1$.

Figure 4:
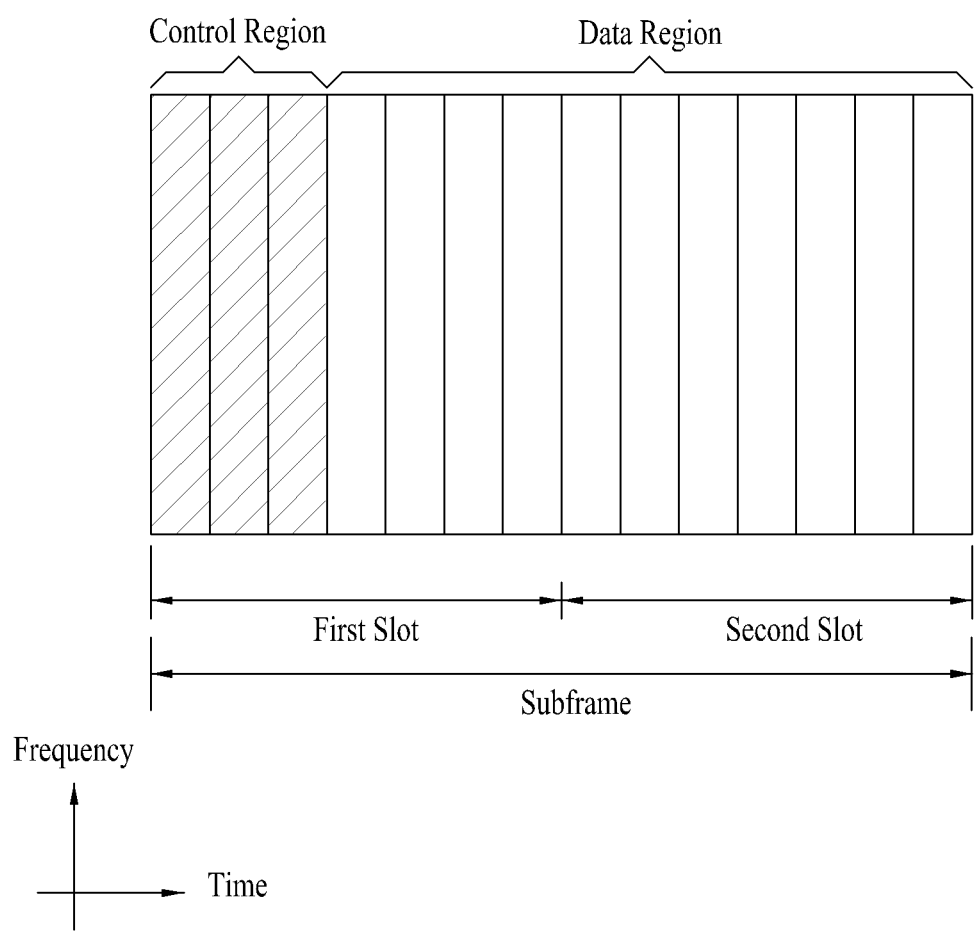
FIG. 4 illustrates an exemplary structure of a DL subframe used in a 3GPP LTE(-A) system.

FIG. 4 illustrates an exemplary structure of a DL subframe used in a 3GPP LTE(-A) system.

Referring to FIG. 4, a DL subframe may be divided into a control region and a data region. The control region includes one or more OFDM symbols, starting from the first OFDM symbol. In the DL subframe of the 3GPP LTE(-A) system, the control region is configured as a region in which a PDCCH can be transmitted. Accordingly, the control region in the DL subframe is also referred to as a PDCCH region. The number of OFDM symbols used for the control region in the DL a subframe may be independently configured on a subframe basis and signaled through a PCFICH. A BS may transmit control information to a UE or UEs in the control region. To transmit control information, a PDCCH, a PCFICH, a PHICH, etc. may be allocated to the control region.

The BS may transmit information related to resource assignment of a Paging CHannel (PCH) and a DL Shared CHannel (DL-SCH) that are transport channels, a UL scheduling grant (hereinafter, UL grant), a DL scheduling grant (hereinafter, DL grant), HARQ information, a Downlink Assignment Index (DAI), a Transmit Power Control (TPC) command, etc. to each UE or UE group on a PDCCH. Information related to resource assignment carried by a PDCCH may include RB assignment information, i.e. frequency resource information, used for UL/DL transmission. The BS may allocate frequency resources for a UE through the PDCCH.

The BS may transmit data to a UE or UE group in the data region. Data transmitted in the data region is referred to as user data. A PDSCH may be allocated to the data region for user data transmission. The PCH and the DL-SCH are transmitted on the PDSCH. A UE may decode control information received on a PDCCH and thus read data received on the PDSCH. The size and usage of control information transmitted on a PDCCH may vary according to Downlink Control Information (DCI) formats and the size of the control information may vary according to coding rates. Information indicating to which UE or UE group PDSCH data is transmitted and information indicating how the UE or UE group should receive and decode the PDSCH data are transmitted on the PDCCH. For example, it is assumed that a specific PDCCH is CRC-masked with a Radio Network Temporary Identity (RNTI) 'A' and information about data transmitted using a radio resource 'B' (e.g. frequency location) and using transport format information 'C' (e.g. transmission block size, modulation scheme, coding information, etc.) is transmitted through a specific DL subframe. Then, the UE monitors the PDCCH using RNTI information thereof. The UE having the RNTI 'A' receives the PDCCH and receives the PDSCH indicated by 'B' and 'C' through information of the received PDCCH.

A plurality of PDCCHs may be transmitted in the control region. A UE may monitor the plurality of PDCCHs to detect a PDCCH thereof. Basically, the UE does not know the location at which a PDCCH thereof is transmitted. Therefore, the UE performs blind detection (referred also to as blind decoding) for all PDCCHs of a corresponding DCI format in every subframe until a PDCCH having an identity thereof is received.

Figure 5:
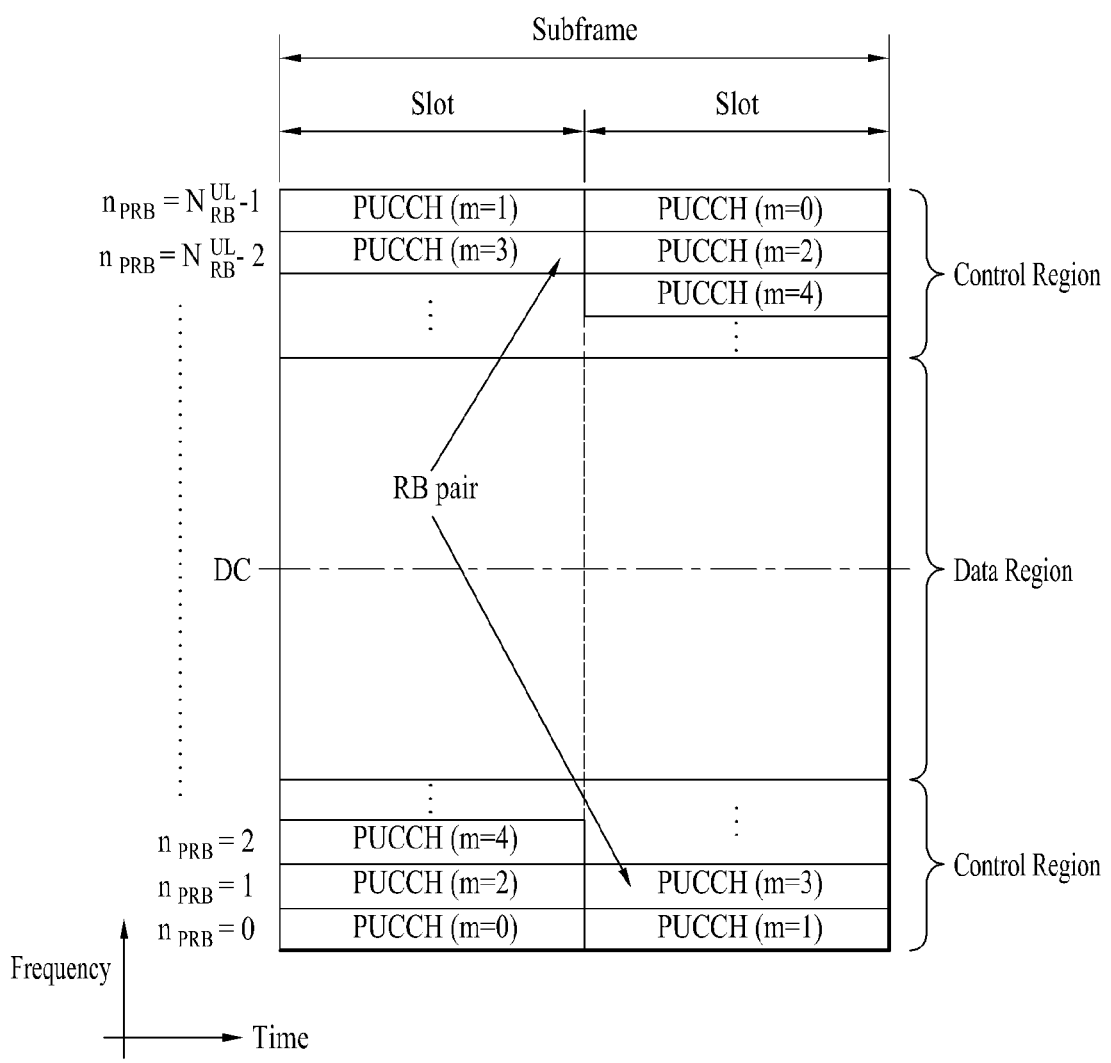
FIG. 5 illustrates an exemplary structure of a UL subframe used in a 3GPP LTE(-A) system.

FIG. 5 illustrates an exemplary structure of a UL subframe used in a 3GPP LTE(-A) system.

Referring to FIG. 5, a UL subframe may be divided into a data region and a control region in the frequency domain. One or more Physical Uplink Control CHannels (PUCCHs) may be allocated to the control region to deliver Uplink Control Information (UCI). One or more Physical Uplink Shared Channels (PUSCHs) may be allocated to the data region to deliver user data. If a UE adopts SC-FDMA for UL transmission, it cannot transmit a PUCCH and a PUSCH simultaneously on a single carrier in order to maintain single carrier characteristics.

In a UL subframe, subcarriers distant from a DC subcarrier are used as the control region. In other words, subcarriers located at both ends of a UL transmission bandwidth are assigned for UCI transmission. The DC subcarrier is reserved without being used for signal transmission and is mapped to a carrier frequency $f_0$ in a frequency up-conversion process performed by an OFDM/SC-FDM signal generator.

A PUCCH for a UE is allocated to an RB pair, which belongs to resources operating in a carrier frequency, in a subframe. The RBs of the RB pair occupy different subcarriers in two slots. This is called frequency hopping of an RB pair allocated to a PUCCH over a slot boundary. However, if frequency hopping is not used, an RB pair occupies the same subcarriers. Irrespective of frequency hopping, a PUCCH for one UE is assigned to an RB pair in one subframe and therefore the same PUCCH is transmitted once through one RB in each slot, a total of two times, in one UL subframe. The UE is assigned a PUCCH resource for UCI transmission by the BS through higher layer signaling, an explicit scheme, or an implicit scheme.

Meanwhile, as described with reference to FIG. 1, CA or bandwidth aggregation technology has recently been discussed. For example, referring to FIG. 1, five CCs, each of 20 MHz, may be aggregated on each of UL and DL to support a bandwidth of 100 MHz. The respective CCs may be contiguous or non-contiguous in the frequency domain. Evolved Universal Terrestrial Radio Access (E-UTRA) operating bands of Table 3 may be used for, but not limited to, CA.

TABLE 3

| E-UTRA Operating Band | Uplink (UL) operating band BS receive UE transmit FUL_low-FUL_high | Downlink (DL) operating band BS transmit UE receive FDL_low-FDL_high | Duplex Mode |
|---|---|---|---|
| 1 | 1920 MHz-1980 MHz | 2110 MHz-2170 MHz | FDD |
| 2 | 1850 MHz-1910 MHz | 1930 MHz-1990 MHz | FDD |
| 3 | 1710 MHz-1785 MHz | 1805 MHz-1880 MHz | FDD |
| 4 | 1710 MHz-1755 MHz | 2110 MHz-2155 MHz | FDD |
| 5 | 824 MHz-849 MHz | 869 MHz-894 MHz | FDD |
| 6[1] | 830 MHz-840 MHz | 875 MHz-885 MHz | FDD |
| 7 | 2500 MHz-2570 MHz | 2620 MHz-2690 MHz | FDD |
| 8 | 880 MHz-915 MHz | 925 MHz-960 MHz | FDD |
| 9 | 1749.9 MHz-1784.9 MHz | 1844.9 MHz-1879.9 MHz | FDD |
| 10 | 1710 MHz-1770 MHz | 2110 MHz-2170 MHz | FDD |
| 11 | 1427.9 MHz-[1447.9] MHz | 1475.9 MHz-[1495.9] MHz | FDD |
| 12 | 699 MHz-716 MHz | 729 MHz-746 MHz | FDD |
| 13 | 777 MHz-787 MHz | 746 MHz-756 MHz | FDD |
| 14 | 788 MHz-798 MHz | 758 MHz-768 MHz | FDD |
| 15 | Reserved | Reserved | FDD |
| 16 | Reserved | Reserved | FDD |
| 17 | 704 MHz-716 MHz | 734 MHz-746 MHz | FDD |
| 18 | 815 MHz-830 MHz | 860 MHz-875 MHz | FDD |
| 19 | 830 MHz-845 MHz | 875 MHz-890 MHz | FDD |
| 20 | 832 MHz-862 MHz | 791 MHz-821 MHz | |
| 21 | 1447.9 MHz-1462.9 MHz | 1495.9 MHz-1510.9 MHz | FDD |
| 22 | [3410] MHz-[3500] MHz | [3510] MHz-[3600] MHz | FDD |
| ... | | | |
| 33 | 1900 MHz-1920 MHz | 1900 MHz-1920 MHz | TDD |
| 34 | 2010 MHz-2025 MHz | 2010 MHz-2025 MHz | TDD |
| 35 | 1850 MHz-1910 MHz | 1850 MHz-1910 MHz | TDD |
| 36 | 1930 MHz-1990 MHz | 1930 MHz-1990 MHz | TDD |
| 37 | 1910 MHz-1930 MHz | 1910 MHz-1930 MHz | TDD |
| 38 | 2570 MHz-2620 MHz | 2570 MHz-2620 MHz | TDD |
| 39 | 1880 MHz-1920 MHz | 1880 MHz-1920 MHz | TDD |
| 40 | 2300 MHz-2400 MHz | 2300 MHz-2400 MHz | TDD |
| [41] | [3400] MHz-[3600] MHz | [3400] MHz-[3600] MHz | TDD |

Note 1:
Band 6 is not applicable.

For convenience, FIG. 1 shows the case in which the bandwidth of a UL CC is the same as the bandwidth of a DL CC and the two are symmetrical. However, the bandwidth of each CC may be independently determined. It is also possible to configure asymmetric CA in which the number of UL CCs is different from the number of DL CCs. A UL CC and a DL CC may also be referred to as UL resources and DL resources, respectively. Even when a BS manages X DL CCs, a frequency bandwidth which can be received by a specific UE may be limited to Y (≤X) DL CCs. In this case, the UE needs to monitor DL signals/data transmitted through the Y CCs. In addition, even when the BS manages L UL CCs, a frequency bandwidth which can be received by a specific UE may be limited to M (≤L) UL CCs. The limited DL/UL CCs for a specific UE are referred to as serving UL/DL CCs configured in the specific UE. The BS may allocate a prescribed number of CCs to the UE by activating some or all of the CCs managed by the BS or by deactivating some CCs managed by the BS. The BS may change the activated/deactivated CCs and change the number of activated/deactivated CCs. Various parameters for CA may be configured cell-specifically, UE group-specifically, or UE-specifically. Once the BS allocates available CCs to the UE cell-specifically or UE-specifically, at least one of the allocated CCs is not deactivated, unless overall CC allocation to the UE is reconfigured or the UE is handed over. Hereinafter, the CC that is not deactivated unless overall CC allocation to the UE is reconfigured is referred to as a Primary CC (PCC) and a CC that the BS can freely activate/deactivate is referred to as a Secondary CC (SCC). Single carrier communication uses one PCC for communication between the UE and the BS and does not use the SCC for communication.

Figure 6:
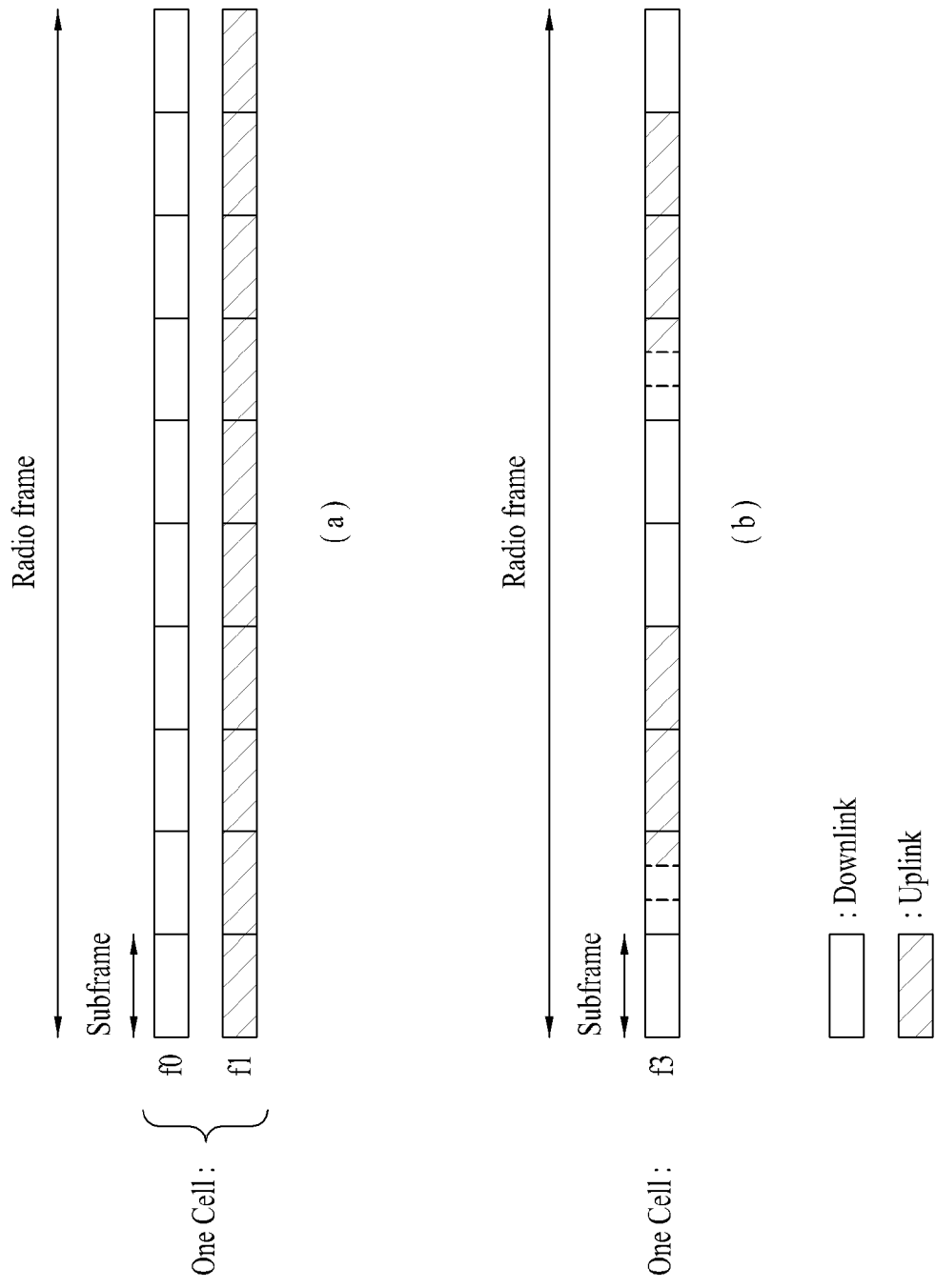
FIG. 6 is a view explaining the meaning of a cell in 3GPP LTE(-A)

Meanwhile, 3GPP LTE(-A) uses the concept of cells to manage radio resources. FIG. 6 is a view explaining the meaning of a cell in 3GPP LTE(-A).

A cell is defined as a combination of DL resources and UL resources, that is, a combination of a DL CC and a UL CC. The cell can be configured of DL resources alone, or of both DL resources and UL resources. When CA is supported, a linkage between a carrier frequency of the DL resources (or DL CC) and a carrier frequency of the UL resources (or UL CC) may be indicated by system information. For example, a combination of the DL resources and the UL resources may be indicated by a System Information Block type 2 (SIB2) linkage.

Referring to FIG. 6(a), for TDD, a UL operating band and a DL operating band are different. Therefore, for FDD, different carrier frequencies are linked to constitute one serving CC (or one serving cell) and the SIB2 linkage indicates a frequency of a UL CC using a frequency different from a frequency of a DL CC accessed by the UE. In other words, in case of FDD, a DL CC and a UL CC linked with the DL CC, which constitute one cell, operate on different frequencies.

Referring to FIG. 6(b), for TDD, a UL operating band and a DL operating band are the same. Therefore, one carrier frequency constitutes one serving CC and the SIB linkage indicates a frequency of a UL CC using the same frequency as a frequency of a DL CC accessed by the UE. In other words, in case of TDD, a DL CC and a UL CC linked with the DL CC, which constitute one cell, operate on the same frequency.

Here, the carrier frequency refers to a center frequency of each cell or CC. A cell that operates on a primary frequency (or PCC) may be referred to as a Primary Cell (PCell) and a cell that operates on a secondary frequency (or SCC) may be referred to as a Secondary Cell (SCell). A PCell refers to a cell used for the UE to perform an initial connection establishment or connection re-establishment procedure. The PCell may also refer to a cell indicated in a handover procedure. As another example, the PCell may also refer to a DL CC on which the UE receives a DL Synchronization Signal (SS) to acquire initial synchronization and a UL CC linked with the DL CC. A carrier corresponding to the PCell in DL is referred to as a DL primary CC (DL PCC) and a carrier corresponding to PCell in UL is referred to as a UL primary CC (UL PCC). A SCell refers to a cell which can be configured after Radio Resource Control (RRC) connection establishment and can be used to provide additional radio resources. According to capabilities of the UE, the SCell may form a set of serving cells together with PCell. The serving cell may be referred to as a serving CC. A carrier corresponding to the SCell in DL is referred to as a DL secondary CC (DL SCC) and a carrier corresponding to the SCell in UL is referred to as a UL secondary CC (UL SCC). For a UE in an RRC_CONNECTED state, for which CA is not configured or CA is not supported, there is only one serving cell comprised of only a PCell. Meanwhile, for a UE in an RRC_CONNECTED state, for which CA is configured, there may be one or more serving cells and the serving cells may include one PCell and one or more SCells. For CA, a network may configure a UE that supports CA by adding one or more SCells to a PCell initially configured in the connection establishment procedure after an initial security activation procedure is initiated. However, even if the UE supports CA, the network may configure only the PCell for the UE, without adding the SCells.

Hereinafter, a cell used for a UE to perform an initial connection establishment or connection re-establishment procedure with a network of a BS, a cell indicated in a handover procedure, or a cell with which initial DL synchronization is acquired is referred to as a PCC and the other cells are referred to as SCCs. The PCC may be referred to as a primary CC, an anchor CC, a PCell, or a primary carrier and the SCC may be referred to as a secondary CC, an SCell, or a secondary CC.

According to current 3GPP LTE(-A), specific control information may be transmitted/received only through a specific CC. In other words, 3GPP LTE(-A) up to now has specified that the PCC is in charge of DL control signaling, associated with System Information (SI) and with Common Control Information (CCI) transmitted/received through a common search space, and UL control signaling, associated with Uplink Control Information (UCI) including Acknowledgement (ACK)/Negative ACK (NACK) for DL data, a Channel Quality Indicator (CQI), etc. Specifically, in terms of DL, the SI is transmitted/received only using the PCC and the UE applies SI acquisition only on the PCC. In addition, Non-Access Stratum (NAS) mobility information is transmitted/received only on the PCC. Further, the common search space, in which all UEs within a coverage area of a corresponding BS attempt to perform blind detection to detect their PDCCHs, is present only on the PCC. In terms of UL, current 3GPP LTE(-A) specifies that control information carried by a PUCCH should be transmitted/received always using the PCC. Accordingly, if the PCC is configured in the UE, the UE can transmit the PUCCH only on the PCC.

According to the current 3GPP LTE(-A), a DL CC on which specific DL control information is transmitted and a UL CC on which the PUCCH is transmitted belong to the same PCC. Once the PCC is configured in the UE, the PCC is not changed unless CC assignment for the UE is entirely reconfigured or the UE is handed over. However, if the amount of UL control information transmitted to the BS increases or a UL control channel of a specific UE is subjected to strong interference by other DL/UL transmission channels, a transmission success rate of the UL control channel from the specific UE to the BS may be lowered. Meanwhile, in case of TDD, most communication standards up to now have considered only aggregation of a plurality of CCs having the same TDD DL-UL configuration. However, when the difference in UL/DL load for each CC and the difference in channel state for each CC are considered, it is desirable to permit a different DL-UL configuration for each CC in terms of efficient use of a communication link. If different TDD DL-UL configurations are allowed, the number of DL subframes and the number of UL subframes may differ according to CCs. For more rapid and flexible transmission/reception of UL control information, it is preferable that a CC having more UL subframes is in charge of UL control signaling. Accordingly, the present invention proposes to flexibly change a CC handing UL control signaling for UCI in a CA situation in which a plurality of serving cells are configured for the UE. In the present invention, a UL PCC and a DL PCC are interpreted as being separately used in terms of transmission of the UCI. In other words, the UL PCC and the DL PCC belong to the same serving cell in a legacy 3GPP LTE(-A) system, whereas the UL PCC and the DL PCC may belong to different serving cells according to the present invention.

Figure 7:
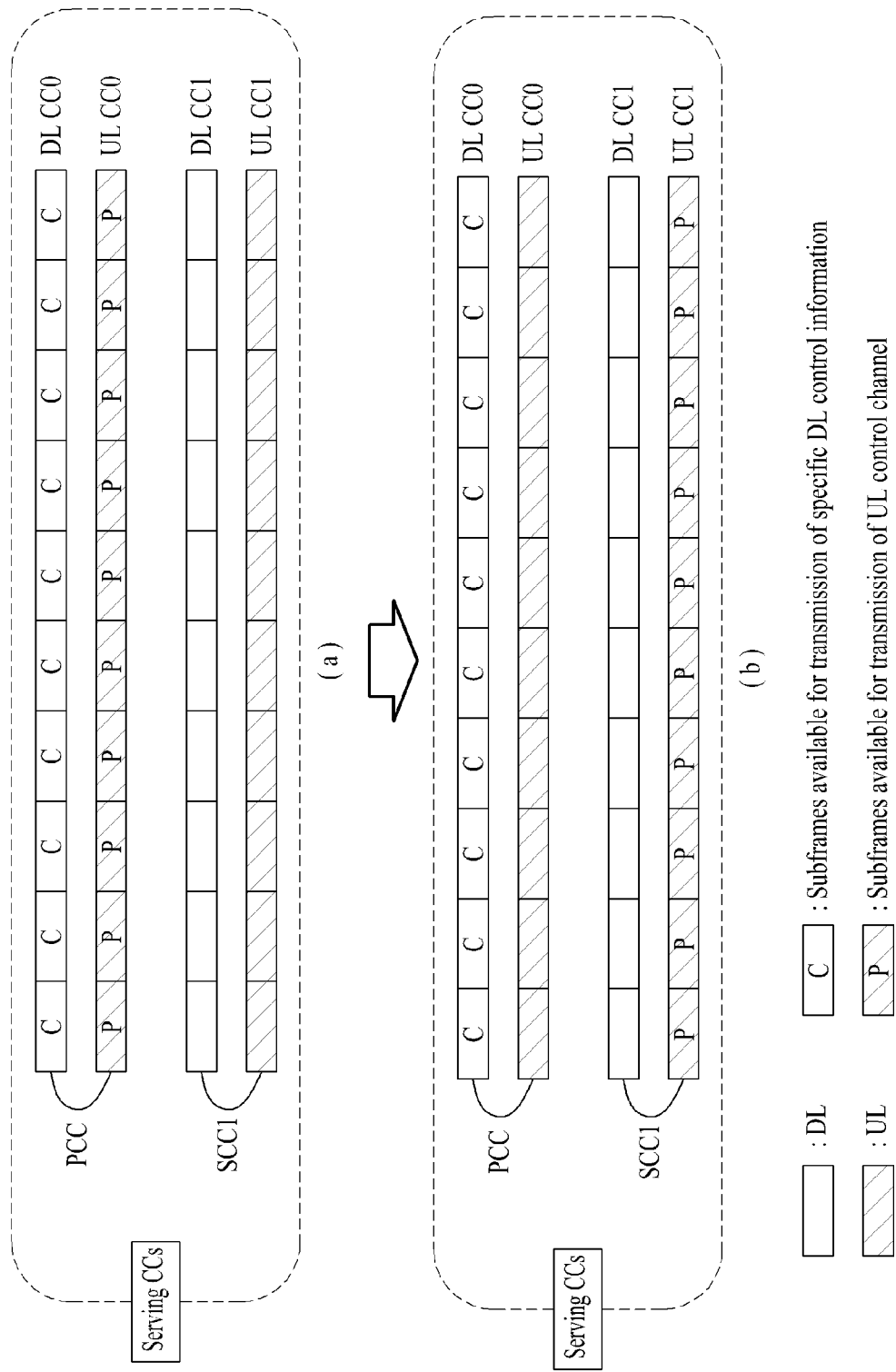
FIG. 7 is a view explaining an example in which the present invention is applied to FDD.

FIG. 7 is a view explaining an example in which the present invention is applied to FDD. In FIG. 7, subframes expressed by "C" indicate subframes on a carrier available for transmission/reception of the above-described specific DL control information and subframes expressed by "P" indicate subframes on a carrier available for transmission of a UL control channel.

Referring to FIG. 7(a), the UE configures a PCC for communication with the BS through initial connection establishment/re-establishment or handover. The UE includes only the PCC as a serving CC before CA is configured. In FDD, the PCC is configured with a DL CC and a UL CC which operate on different carrier frequencies. That is, the PCC of FIG. 7 corresponds to a combination of DL CC0 and UL CC0. If the PCC is configured in the UE, the DL CC and the UL CC belonging to the PCC are (automatically) initially configured as a DL PCC and a UL PCC, respectively. Accordingly, in FIG. 7, DL CC0 is initially configured as the DL PCC and UL CC0 is initially configured as the UL PCC. The BS transmits the aforementioned specific DL control information to the UE on DL CC0 belonging to the PCC. The UE attempts to acquire the specific DL control information only on DL CC0 belonging to the PCC. In addition, the UE transmits UL control channels (e.g. PUCCHs) thereof only on UL CC0 belonging to the PCC. The BS receives the UL control channel(s) from the UE connected thereto through UL CC0 on UL CC0 belonging to the PCC.

The BS may add one or more SCCs as the serving CC for the UE to allocate additional radio resources to the UE. The BS transmits information about the SCC(s) to be added to the UE through higher layer signaling (e.g. RRC signaling). For example, the BS may indicate one of E-UTRA operation bands 1 to 22 of Table 3, except for a band corresponding to the PCC, as an operation band of an SCC to the UE. Referring to FIG. 7(a), upon reception of control information indicating that SCC1 is added from the BS, the UE configures a plurality of serving CCs to be used for communication with the BS by adding SCC1 to the PCC. SCC1 of FIG. 7 corresponds to a combination of DL CC1 and UL CC1. The UE may use the PCC and SCC1 for DL/UL communication with the BS. The UE may receive a DL control channel (e.g. PDCCH) and a DL data channel (e.g. PDSCH) from the BS on DL CC0 belonging to the PCC and/or DL CC1 belonging to the SCC1. The UE may transmit a UL data channel (e.g. PUSCH) to the BS on UL CC0 belonging to the PCC and/or UL CC1 belonging to the SCC1. Notably, although the UE may perform, on the PCC, blind decoding in both a common search space and a UE-specific search space in order to detect the DL control channel, the UE may perform, on the SCC1, blind decoding in only the UE-specific search space allocated thereto. In addition, specific DL control information such as SI, NAS mobility information, and a DL SS may be transmitted/received only on DL CC0 belonging to the PCC. The UL control channel of the UE may be transmitted/received only on UL CC0 belonging to the PCC. That is, even though the SCC1 is added as the serving CC, the UE uses DL CC0 of the PCC as a DL PCC and UL CC0 of the PCC as a UL PCC.

However, according to the present invention, a CC other than UL CC0 belonging to the PCC may be configured as a CC for transmission of the UL control channel, i.e. as the UL PCC. For example, if the UL channel state of the SCC1 is better than the UL channel state of the PCC or if there are a large number of UEs transmitting the UL control channel on UL CC0 of the PCC, the BS may command the UE to configure UL CC1 belonging to the SCC1 as the UL PCC. The BS may cell-specifically or UE-specifically configure a CC other than the UL CC of the PCC as the UL PCC through RRC signaling or L1/L2 signaling. The UE may receive information (hereinafter, UL PCC information) about a CC to be configured as the UL PCC from the BS and configure the UL PCC according to the UL PCC information. For example, referring to FIG. 7(b), the BS may transmit UL PCC information indicating that UL CC1 belonging to an SCC1 should be configured as the UL PCC to the UE and the UE may transmit a UL control channel thereof on UL CC1 rather than UL CC0 according to the UL PCC information. Because the BS knows that UL CC1 is configured as the UL PCC of the UE, the BS may detect/receive the UL control channel of the UE on UL CC1. Even if the UL PCC is changed to UL CC1 belonging to the SCC1, the UL data channel may be transmitted/received using the PCC and SCC1. That is, the UL data channel may be transmitted/received on UL CC0 belonging to the PCC as in FIG. 7(a) or may be transmitted/received on UL CC1 belonging to the SCC1. Which CC is used for transmission of the UL data channel depends on UL scheduling of the BS. Meanwhile, since a DL PCC is not changed even if the UL PCC is changed, the aforementioned specific DL control information is transmitted/received on DL CC0 belonging to the PCC as in FIG. 7(a). The DL data channel may be transmitted/received on DL CC0 as in FIG. 7(a) or may be transmitted/received on UL CC1 belonging to the SCC1. Which CC is used for transmission of the DL data channel depends on DL scheduling of the BS.

The UL PCC may be changed again to UL CC0 of the PCC from UL CC1 of the SCC1. If a plurality of SCCs is configured in the UE, the UL PCC may be changed to a UL CC belonging to other SCCs from UL CC1 of the SCC1.

Figure 8:
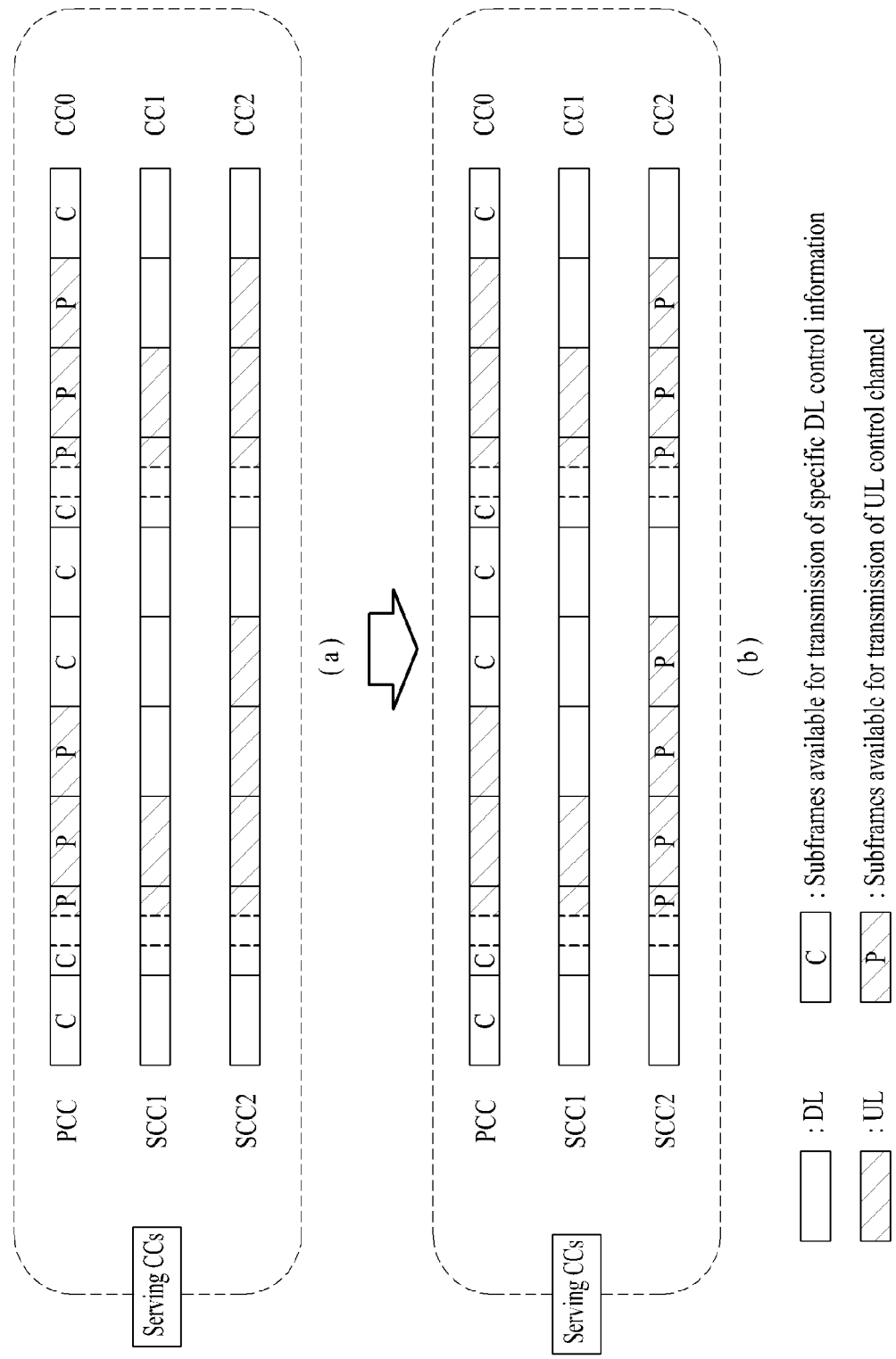
FIG. 8 is a view explaining an example in which the present invention is applied to TDD.

FIG. 8 is a view explaining an example in which the present invention is applied to TDD. Specifically, FIG. 8 illustrates the case in which CC0, CC1, and CC2 operate as configuration #1, configuration #2 and configuration #6 of Table 1 under the assumption that aggregated CCs may have different TDD DL-UL configurations. In FIG. 8, subframes expressed by "C" indicate subframes on a carrier available for transmission/reception of the above-described specific DL control information and subframes expressed by "P" indicate subframes on a carrier available for transmission of a UL control channel. Although the present invention is described by way of example of CCs having different TDD DL-UL configurations in FIG. 8, the present invention may be applied to CCs having the same TDD DL-UL configuration.

Referring to FIG. 8(a), a UE configures a PCC for communication with a BS through initial connection establishment/re-establishment or handover. The UE includes only the PCC as a serving CC before CA is not configured. If the PCC is configured in the UE, the DL CC and the UL CC belonging to the PCC are (automatically) initially configured as a DL PCC and a UL PCC, respectively. In TDD, the PCC is configured DL CC0 and UL CC0 which operate on the same carrier frequency (i.e. DL CC0=UL CC0=CC0=PCC). Accordingly, in FIG. 8, CC0 is initially configured as the DL PCC and simultaneously as the UL PCC. The BS transmits the afore-mentioned specific DL control information to the UE on DL CC0 corresponding to the PCC. The UE attempts to acquire the specific DL control information only on CC0 in a subframe in which CC0, which is the PCC, operates in DL. In addition, the UE transmits UL control channels of the UE only on CC0 in a subframe in which CC0 operates in UL. The BS receives the UL control channel(s) from the UE connected through CC0 to the BS on CC0.

The BS may add one or more SCCs for allocation of additional radio resources to the UE as the serving CC for the UE. The BS transmits information about the SCC(s) to be added to the UE through higher-layer signaling (e.g. RRC signaling). For example, the BS may indicate one of E-UTRA operation bands 33 to 41 of Table 3, except for a band corresponding to the PCC, as an operation band of an SCC to the UE. Referring to FIG. 8(a), upon reception of control information indicating that SCC1 and SCC2 are added from the BS, the UE configures a plurality of serving CCs to be used for communication with the BS by adding SCC1 and SCC2 to the PCC. In FIG. 8, DL CC1=UL CC1=CC1=SCC1 and DL CC2=DL CC2=CC2=SCC2. The UE may use the PCC, SCC1, and SCC2 for DL/UL communication with the BS. The UE may receive a DL control channel and a DL data channel from the BS in a subframe in which a corresponding CC operates in DL, using CC0 of the PCC, CC1 of the SCC1, and/or CC2 of the SCC2. The UE may transmit a UL data channel to the BS in a subframe in which a corresponding CC operates in UL, using CC0 of the PCC, CC1 of the SCC1, and/or CC2 of the SCC2. Notably, although the UE may perform, in a DL subframe of the PCC, blind decoding in both a common search space and a UE-specific search space in order to detect the DL control channel, the UE may perform, in a DL subframe of the SCC1 and a DL subframe of the SCC2, blind decoding in only the UE-specific search space allocated thereto. In addition, specific DL control information such as SI, NAS mobility information, and a DL SS may be transmitted/received only on CC0, which is the PCC. That is, even though the SCC1 and SCC2 are added as the serving CC, the UE uses CC0 as a DL PCC and a UL PCC.

However, according to the present invention, a CC other than the PCC may be configured as a CC for transmission of the UL control channel, i.e. the UL PCC. For example, if the UL channel state of the SCC1 or SCC2 is better than the UL channel state of the PCC or if there are a large number of UEs transmitting the UL control channel on CC0, the BS may command the UE to configure the SCC1 or SCC2 as the UL PCC. The BS may cell-specifically or UE-specifically configure CCs other than the UL CC of the PCC as the UL PCC through RRC signaling or L1/L2 signaling. For example, the UE may receive information (hereinafter, UL PCC information) about a CC to be configured as the UL PCC from the BS and configure the UL PCC according to the UL PCC information. For example, referring to FIG. 8(b), the BS may transmit the UL PCC information indicating that SCC2 should be configured as the UL PCC to the UE and the UE may transmit a UL control channel thereof on CC2 rather than CC0 according to the UL PCC information. If serving cells have different TDD DL-UL configurations, the UE may automatically configure the UL PCC without the need of additional signaling from the BS. For example, the UE may configure a CC having the highest ratio of UL subframes as the UL PCC. In FIG. 8, because the SCC2 has the largest UL subframes, the UE may configure the SCC2 as the UL PCC.

Because the BS knows that the SCC2 is configured as the UL PCC of the UE, the BS may detect/receive the UL control channel of the UE on the SCC2. Even if the UL PCC is changed to the SCC2 from the PCC, the UL data channel may be transmitted/received using the PCC, SCC1, and/or SCC2. That is, the UL data channel may be transmitted/received on CC0 of the PCC, may be transmitted/received on CC1 of the SCC1, or may be transmitted/receive on CC2 of the SCC2, as in FIG. 8(a). Which CC is used for transmission of the UL data channel depends on UL scheduling of the BS. Meanwhile, since the DL PCC is not changed even if the UL PCC is changed, the aforementioned specific DL control information is transmitted/received on PCC in a DL subframe of the PCC as in FIG. 8(a). The DL data channel may be transmitted/received on the PCC in the DL subframe of the PCC, may be transmitted/received on the SCC1 in a DL subframe of the SCC1, or may be transmitted/received on the SCC2 in a DL subframe of the SCC2, as in FIG. 8(a). Which CC is used for transmission of the DL data channel depends on DL scheduling of the BS.

The BS may change the UL PCC of the UE again to the SCC2, which is another serving CC, or to PCC from the SCC1. Based on the UL PCC information from the BS, the UE may change the UL PCC again to the SCC2, which is another serving CC, or to the PCC from the SCC1 configured currently as the UL PCC.

In the embodiments described above with reference to FIGS. 7 and 8, upon reception of UL PCC information indicating the same CC as a CC configured currently as a UL PCC, the UE may maintain the UL PCC without modification. Upon reception of UL PCC information indicating another CC different from a specific CC configured currently as a UL PCC, the UE may change the UL PCC to the other CC from the specific CC.

Figure 9:
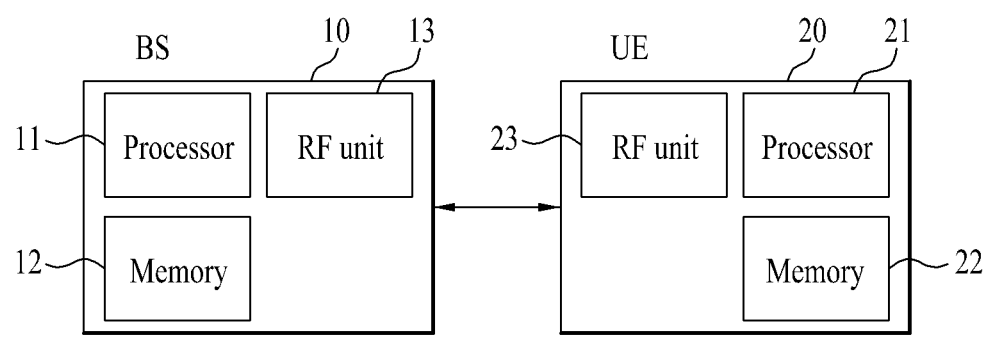
FIG. 9 is a block diagram illustrating elements of a BS 10 and a UE 20 by which the present invention is performed.

FIG. 9 is a block diagram illustrating elements of a BS 10 and a UE 20 by which the present invention is performed.

In the above embodiments of the present invention, the BS 10 may be a transmission entity of DL control information, DL control channels, and DL data channels and the UE 20 may be a reception entity of DL control information, DL control channels, and DL data channels. In the above embodiments of the present invention, the UE 20 may be a transmission entity of UL control information, UL control channels and UL data channels and the BS 10 may be a reception entity of UL control information, UL control channels, and UL data channels.

The BS 10 and the UE 20 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so as to perform at least one of the above-described embodiments of the present invention.

The memories 12 and 22 may store programs for processing and controlling the processors 11 and 21 and may temporarily storing input/output information. The memories 12 and 22 may be used as buffers.

The processors 11 and 21 control the overall operation of various modules in the BS or UE. The processors 11 and 21 may perform various control functions to perform the present invention. The processors 11 and 21 may be referred to as controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the BS codes and modulates signals and/or data scheduled by the processor 11 or a scheduler connected to the processor 11 to be transmitted to the exterior. The coded and modulated signals and/or data are transmitted to the RF unit 13. For example, the processor 11 converts a data stream to be transmitted into K layers through demultiplexing, channel coding, scrambling and modulation. The coded data stream is also referred to as a codeword and is equivalent to a transport block which is a data block provided by a Medium Access Control (MAC) layer. One Transport Block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer) transmit antennas.

The processor 11 may assign DL/UL data to at least one of serving CCs configured in the UE 20. The processor 11 may control the RF unit 13 to transmit DL/UL assignment information (e.g. DL/UL grant) regarding the DL/UL data to the UE 20 on a DL control channel using at least one of the serving CCs. In addition, the processor 11 may control the RF unit 13 to transmit the DL data to the UE 20 on a DL data channel according to the DL assignment information. The processor 11 may control the RF unit 13 to receive the UL data from the UE on a UL data channel according to the UL assignment information. The processor 11 may control the RF unit 13 to transmit specific DL control information (e.g. SI, NAS mobility information, CCI transmitted in a common search space, a DL SS, etc.) to the UE 20 on a PCC configured in the UE 20. The processor 11 may generate UL PCC information commanding a change of a UL PCC configured as a specific CC to another CC according to an embodiment of the present invention. The processor 11 may configure the specific CC, among the serving CCs configured in the UE 20, as the UL PCC and control the RF unit 13 to transmit the UL PCC information indicating the specific CC to the UE 20. For example, the processor 11 may control the RF unit 13 to transmit UL PCC information indicating a specific SCC to the UE 20 in order to change the PCC initially configured as the UL PCC to the specific SCC. The processor 11 may change the UL PCC configured as the specific SCC to another SCC or PCC and control the RF unit 13 to transmit corresponding UL PCC information to the UE 20. The processor 11 may control the RF unit 13 to receive a UL control channel of the UE 20 only using UL PCC(s) configured according to the present invention.

A signal processing process of the UE 20 is the reverse of the signal processing process of the BS 10. Under control of the processor 21, the RF unit 23 of the UE 10 receives radio signals transmitted by the BS 10. The RF unit 23 may include $N_r$ receive antennas and frequency down-converts each of signals received through receive antennas into a baseband signal.

The processor 21 may control the RF unit 23 to receive DL/UL assignment information (e.g. DL/UL grant) regarding the DL/UL data on a DL control channel using at least one of the serving CCs configured in the UE. In addition, the processor 21 may control the RF unit 23 to receive the DL data from the BS on a DL data channel according to the DL assignment information. The processor 21 may control the RF unit 23 to transmit the UL data to the BS 10 on a UL data channel according to the UL assignment information. The processor 21 may control the RF unit 23 to receive specific DL control information (e.g. SI, NAS mobility information, CCI transmitted in a common search space, a DL SS, etc.) from the BS 10 on a PCC configured in the UE 20. The processor 21 may change a CC configured as a UL PCC to another CC according to an embodiment of the present invention. For example, if the RF unit 23 receives UL PCC information from the BS 10, the processor 21 may change a serving CC which has been configured as the UL PCC to another serving CC according to the UL PCC. For example, if a UL PCC configured in the UE 20 is an initially configured PCC and if the UL PCC information includes information indicating another serving CC other than the PCC, the processor 21 may change the UL PCC to the other serving CC indicated by the UL PCC information from the PCC. In addition, if the RF unit 23 receives new UL PCC information indicating a new CC, the processor 21 may configure the new CC as a UL PCC according to the new UL PCC information. The new CC may be an SCC or a PCC. The processor 21 may control the RF unit 23 to receive a UL control channel of the UE 20 only on serving CC(s) configured as the UL PCC.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. A signal transmitted through each antenna cannot be decomposed by the UE 20. A Reference Signal (RS) transmitted in correspondence to a corresponding antenna defines an antenna viewed from the UE 20 and enables the UE 20 to perform channel estimation for the antenna, irrespective of whether a channel is a single radio channel from one physical channel or a composite channel from a plurality of physical antennas including the antenna. That is, an antenna is defined such that a channel for transmitting a symbol on the antenna can be derived from the channel through which another symbol on the same antenna is transmitted. An RF unit supporting a Multi-Input Multi-Output (MIMO) function of transmitting and receiving data using a plurality of antennas may be connected to two or more antennas.

The detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The present invention is applicable to a BS, a UE, or other equipment in a wireless communication system.

The invention claimed is:

1. A method for transmitting an uplink signal by a user equipment in which a plurality of serving cells are configured, the method comprising:

receiving, by the user equipment, UL primary cell (UL PCell) information indicating a serving cell among the plurality of serving cells;

configuring, by the user equipment, the indicated serving cell as an UL PCell;

receiving, by the user equipment, a physical downlink control channel (PDCCH) through one of the plurality of serving cells; and transmitting, by the user equipment, a physical uplink control channel (PUCCH) associated with the PDCCH through the UL PCell, wherein the UL PCell responsible for transmission of the PUCCH is configured to be different from a serving cell configured as a DL PCell responsible for reception of DL common control information when the plurality of serving cells include at least two serving cells of which time division duplex (TDD) UL-DL configurations are different.

2. The method according to claim 1, wherein the plurality of serving cells include one PCell and one or more secondary cells (SCells), the one PCell being the DL PCell, one of the one or more SCells being configured as the UL PCell.

3. The method according to claim 2, wherein:

the DL PCell among the plurality of serving cells is configured during initial connection establishment of the user equipment and the one or more SCells among the plurality of serving cells are added after the initial connection establishment.

4. The method according to claim 2, wherein configuring the UL PCell includes changing the UL PCell from the serving cell configured as the DL PCell to the indicated serving cell.

5. A method for receiving, by a base station, an uplink signal from a user equipment in which a plurality of serving cells are configured, the method comprising:

configuring, by the base station, a serving cell among the plurality of serving cells as an UL primary cell (UL PCell);

transmitting, by the base station, UL PCell information indicating the serving cell configured as the UL PCell to the user equipment;

transmitting, by the base station, a physical downlink control channel (PDCCH) through one of the plurality of serving cells; and receiving, by the base station, a physical uplink control channel (PUCCH) associated with the PDCCH through the UL PCell from the user equipment, wherein the UL PCell responsible for reception of the PUCCH is configured to be different from a serving cell configured as a DL PCell responsible for transmission of DL common control information when the plurality of serving cells include at least two serving cells of which time division duplex (TDD) UL-DL configurations are different.

6. The method according to claim 5, wherein the plurality of serving cells include one PCell and one or more secondary cells (SCells), the one PCell being the DL PCell, one of the one or more SCells being configured as the UL PCell.

7. The method according to claim 6, wherein:

the DL PCell among the plurality of serving cells is configured during initial connection establishment of the user equipment and the one or more SCells among the plurality of serving cells are added after the initial connection establishment.

8. The method according to claim 6, wherein configuring the UL PCell includes changing UL PCell from the serving cell configured as the DL PCell to the indicated serving cell.

9. A user equipment, in which a plurality of serving cells are configured, for transmitting an uplink signal, the user equipment comprising:
    a radio frequency (RF) unit configured to transmit/receive a radio signal; and
    a processor configured to control the RF unit, the processor configured to:
        control the RF unit to receive UL primary cell (UL PCell) information indicating a serving cell among the plurality of serving cells,
        configure the indicated serving cell as an UL PCell,
        control the RF unit to receive a physical downlink control channel (PDCCH) through one of the plurality of serving cells, and
        control the RF unit to transmit a physical uplink control channel (PUCCH) associated with the PDCCH through the UL PCell,
        wherein the UL PCell responsible for transmission of the PUCCH is configured to be different from a serving cell configured as a DL PCell responsible for reception of DL common control information when the plurality of serving cells include at least two serving cells of which time division duplex (TDD) UL-DL configurations are different.

10. The user equipment according to claim 9, wherein the plurality of serving cells include one PCell and one or more secondary cells (SCells), the one PCell being the DL PCell, one of the one or more SCells being configured as the UL PCell.

11. The user equipment according to claim 10, wherein:
    the DL PCell among the plurality of serving cells is configured during initial connection establishment of the user equipment and the one or more SCells among the plurality of serving cells are added after the initial connection establishment.

12. The user equipment according to claim 10, wherein the processor is configured to change the UL PCell from the serving cell configured as the DL PCell to the indicated serving cell.

13. A base station for receiving an uplink signal from a user equipment in which a plurality of serving cells are configured, the base station comprising:
    a radio frequency (RF) unit configured to transmit/receive a radio signal; and
    a processor configured to control the RF unit, the processor configured to:
        configure a serving cell among the plurality of serving cells as an UL primary cell (UL PCell),
        control the RF unit to transmit UL PCell information indicating the serving cell configured as the UL PCell to the user equipment,
        control the RF unit to transmit a physical downlink control channel (PDCCH) through one of the plurality of serving cells; and
        control the RF unit to receive a physical uplink control channel (PUCCH) associated with the PDCCH through the UL PCell,
        wherein the UL PCell responsible for reception of the PUCCH is configured to be different from a serving cell configured as a DL PCell responsible for transmission of DL common control information when the plurality of serving cells include at least two serving cells of which time division duplex (TDD) UL-DL configurations are different.

14. The base station according to claim 13, wherein the plurality of serving cells include one PCell and one or more secondary cells (SCells), the one PCell being the DL PCell, one of the one or more SCells being configured as the UL PCell.

15. The base station according to claim 14, wherein:
    the DL PCell among the plurality of serving cells is configured during initial connection establishment of the user equipment and the one or more SCells among the plurality of serving cells are added after the initial connection establishment.

16. The base station according to claim 14, wherein the processor changes the UL PCell from the serving cell configured as the DL PCell to the indicated serving cell.

* * * * *